A. G. SHERMAN.
MEASURING AND DISPENSING CAN OR TANK.
APPLICATION FILED DEC. 16, 1908.

957,005.

Patented May 3, 1910.

Witnesses
Clarence E. Day
Alecia Townsend

Inventor
Alvin G. Sherman
Parker & Burton
Attorneys

UNITED STATES PATENT OFFICE.

ALVIN G. SHERMAN, OF DETROIT, MICHIGAN.

MEASURING AND DISPENSING CAN OR TANK.

957,005.  Specification of Letters Patent.  Patented May 3, 1910.

Application filed December 16, 1908. Serial No. 467,738.

To all whom it may concern:

Be it known that I, ALVIN G. SHERMAN, citizen of the United States, residing at Detroit, county of Wayne, State of Michigan, have invented a certain new and useful Improvement in Measuring and Dispensing Cans or Tanks, and declare the following to be a full, clear, and exact description of the same, such as will enable others skilled in the art to which it pertains to make and use the same, reference being had to the accompanying drawings, which form a part of this specification.

This invention relates to measuring and dispensing cans or tanks; it has for its object an improved dispensing can from which only a limited amount of liquid can be poured at a single pouring, and which requires the can to be turned to an erect position before the second pouring can be made.

Figure 1:
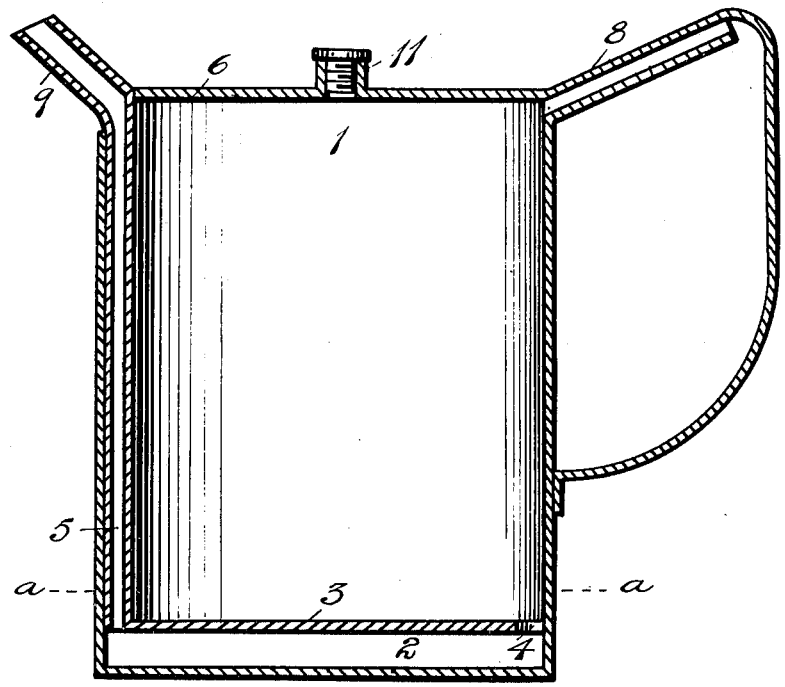
Figure 2:
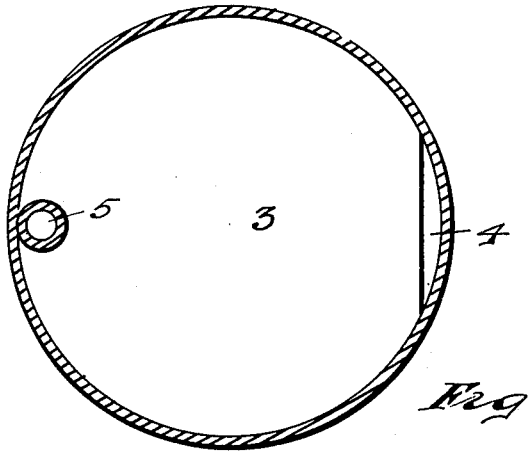

In the drawing:—Figure 1, is a sectional elevation. Fig. 2, is a cross section at the line a—a of Fig. 1.

The chamber within the tank is divided into a main or storage chamber and a measuring chamber.

The main chamber 1 of the can is separated for the measuring chamber 2 by a diaphragm 3, which divides the chamber within the tank into two compartments, one for the storage of the liquid, and the other for the measuring of the liquid. The two chambers communicate by a passage 4, which leads through the diaphragm 3 on the handle side of the main tank, and in close relation to the wall of the main tank. The liquid is poured from the measuring chamber through a tube 5, which leads out from the measuring chamber 2, on the side opposite the handle, and leads through the top 6, and terminates with a spout 9. The main chamber is filled through a covered filling opening 11. The main chamber is vented by a short pipe 8, which leads into the main chamber directly under the handle, and extends along the handle to a distance such that there is no liability of any outflow through the vent pipe, either when the tank is filled, or subsequently, if the air in the tank above the liquid is expanded by change of temperature, and the liquid is not forced out through the vent pipe by the expansion of air contained in the tank at times when the temperature of the tank and its contents may be raised. The external opening of the vent pipe 8 is higher than the top of the filling opening 11 and extends so far to the rear of the vessel under the handle that it remains constantly on a higher plane than the surface of the liquid in the vessel, as the vessel is tilted to entirely empty the measuring compartment 2.

The device operates most advantageously when the chamber 1 is not completely filled, that is, when the can is used actively as a dispensing can, which is not required to be completely filled whenever the supply of liquid it contains is renewed, rather than as a storage can, in which as much as possible is poured in the first instance. When not completely filled, as soon as the can is tilted sufficiently for the surface of the liquid to drop on the rear or handle side correspondingly with its rise on the front or spout side, so that it reaches the passage 4, the further flow of liquid from the main chamber 1 into the measuring chamber 2, through this passage-way, is prevented by the diaphragm 3, and as the opening at the top of the chamber is closed by the cap over the filling opening 11, the can, as a whole, can be tilted as much as desired until all of the liquid that has accumulated in the measuring chamber 2, and in the tube 5, has been poured out through the spout 9. As soon as the can is restored to its normal upright position, or even so closely thereto as to permit the mass of liquid in the main chamber to submerge the passage-way 4, the refilling of the measuring chamber 2, and also of the tube 5, to a height corresponding to that of the liquid remaining in the main chamber 1, is resumed, and the device is almost immediately ready for another pouring of the measured quantity of liquid.

What I claim is:—

A measuring and dispensing can having a diaphragm a storage chamber and a measuring chamber and with a passage through said diaphragm adjacent to the wall of the receptacle and on the handle side thereof, a discharge conduit from the measuring chamber leading along the side of the storage chamber to the top of said receptacle and adapted to completely discharge the measuring chamber when the receptacle is tilted, a handle, and a vent tube projecting from the side of said vessel at the top thereof and extending rearwardly on the handle side thereof to a distance to prevent the discharge of any part of the contents therethrough when the vessel is tilted to fully discharge the measuring chamber, substantially as described.

In testimony whereof, I sign this specification in the presence of two witnesses.

ALVIN G. SHERMAN.

Witnesses:
CHARLES F. BURTON,
VIRGINIA C. SPRATT.